United States Patent [19]
Jakob et al.

[11] Patent Number: 6,153,878
[45] Date of Patent: Nov. 28, 2000

[54] DEVICE FOR LOCATING OBJECTS PENETRATING INTO A REGION OF SPACE TO BE MONITORED

[75] Inventors: Hermann Jakob, Winden; Thomas Meinert, Emmendingen, both of Germany

[73] Assignee: Schmersal-EOT GmbH & Co. KG, Germany

[21] Appl. No.: 09/135,069

[22] Filed: Aug. 17, 1998

[51] Int. Cl.$^7$ ...................................................... H01J 3/14
[52] U.S. Cl. .......................................... 250/216; 250/221
[58] Field of Search .................................. 250/216, 221, 250/239; 359/212, 220, 221

[56] References Cited

U.S. PATENT DOCUMENTS

| | | | |
|---|---|---|---|
| 5,337,189 | 8/1994 | Krawczyk | 359/850 |
| 5,357,102 | 10/1994 | Ishika | 250/216 |
| 5,455,669 | 10/1995 | Wetteborn | 356/5.01 |

FOREIGN PATENT DOCUMENTS

| | | |
|---|---|---|
| 0544945 | 12/1991 | European Pat. Off. . |
| 2454461 | 5/1976 | Germany . |
| 4315077 | 11/1993 | Germany . |
| 4412044A1 | 4/1994 | Germany . |
| 4340756 | 6/1994 | Germany . |
| 19530281 | 2/1997 | Germany . |

OTHER PUBLICATIONS

"Scanning Laser Radar for on–the Road Distance Measuring"–Automotive Engineering, Jul. 1997.

*Primary Examiner*—Que T. Le
*Attorney, Agent, or Firm*—Douglas J. Christensen

[57] ABSTRACT

The invention relates to a device for locating objects penetrating into a region of space to be monitored, having a housing (1) which contains a transmitter (3) and a receiver (4) for optical radiation as well as a rotatable optical deflecting device (8) with, on the one hand, a transmitting deflecting mirror (11), which can be rotated about a rotation axis (10) and is inclined with respect to the latter for a beam (5) emerging through a window (2) in the housing (1) into the region of space to be swept by the emerging beam (5) and, on the other hand, with a receiving deflecting mirror (12) for directing a beam (16), reflected from the region of space and incident through the window (2), to the receiver (4). The window (2) is constructed in the form of a spherical section (18) whose centre is the point of intersection of the rotation axis (10) with the optical axes of the incident and emerging beams (5, 16), the transmitting deflecting mirror (11) and the receiving deflecting mirror (12) perpendicular thereto being arranged at an angle of 45° to the rotation axis (10).

10 Claims, 3 Drawing Sheets

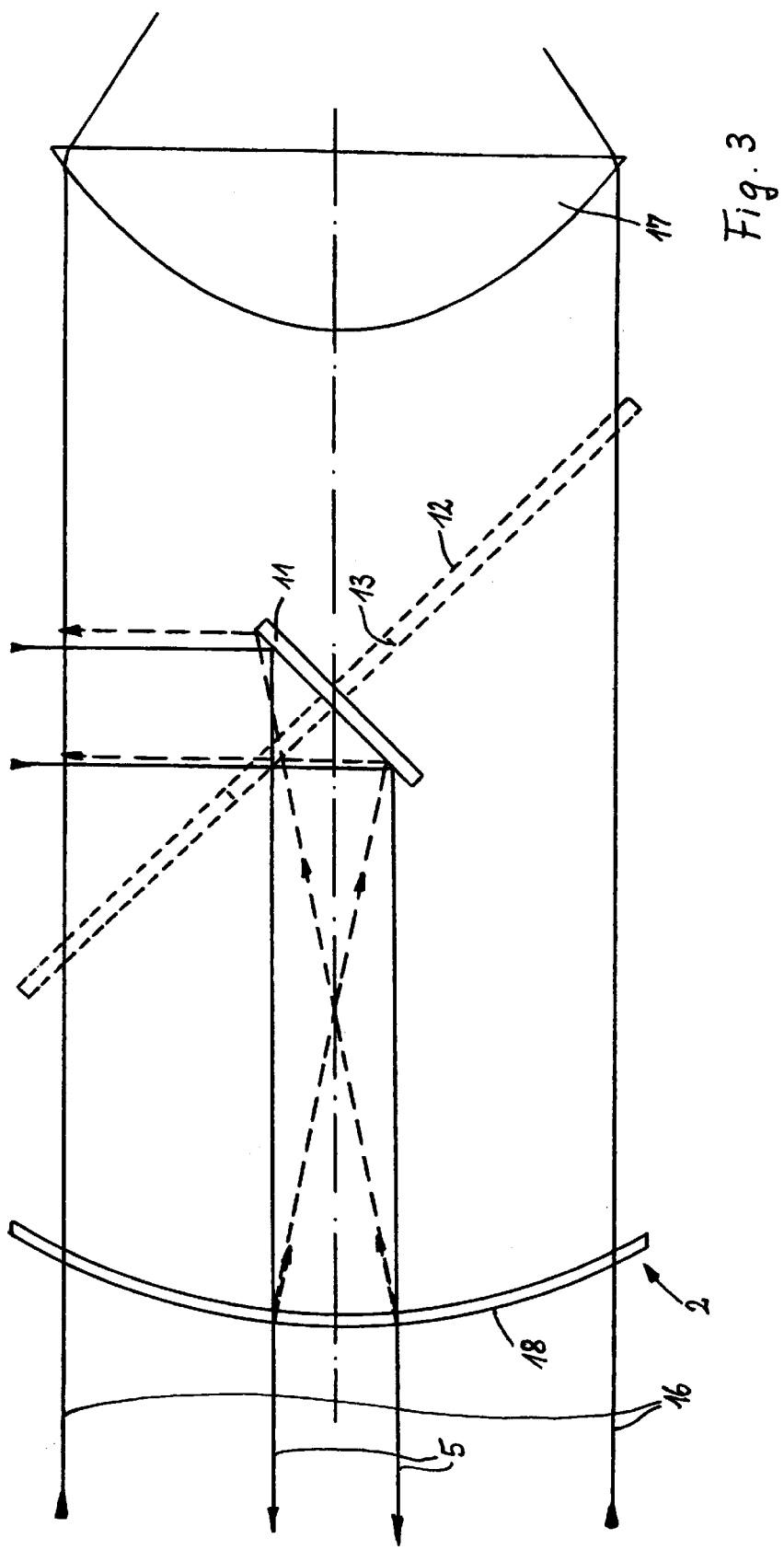

DEVICE FOR LOCATING OBJECTS PENETRATING INTO A REGION OF SPACE TO BE MONITORED

BACKGROUND OF THE INVENTION

The invention relates to a device for locating objects penetrating into a region of space to be monitored. Such devices are for instance used in driver-less transporting systems to determine whether an obstacle could collide with a transport vehicle, and if so then to stop the vehicle.

Such a device is disclosed in published German Patent Application 4 340 756 in which there is provided a housing with a window which extends over an angle of 180°, is positioned obliquely relative to the emitted optical radiation and is provided on the underside with an angled edge region. Arranged along the circumference of the window are light barriers whose radiation passes the window and the edge region thereof in order in this way to detect any pollution. The radiation deflected by the deflecting device at a variable angle is partially reflected upon transmission at the two boundary surfaces of the window. Although inclination of the window does prevent said radiation component from inadvertently falling onto the receiver and causing interference, the effect of such inclination of the boundary surfaces to the incident beam is that its optical effect differs in the two principal cutting planes (meridional plane and sagittal plane), resulting in an astigmatic effect. This leads to a considerable restriction, particularly in the case of thicker walls of the window and high demands placed on the beam guidance. Moreover, radiation scattered or detracted at polluted sites of the optical deflecting device or on body edges present there can pass onto the receiver by deflection at the window.

A further device for locating objects penetrating into a region of space to be monitored is disclosed in published German Patent Application 4 315 077, in which an optical deflecting device which can be rotated about an axis is provided which is composed of two mirrors arranged perpendicular to one another, one mirror, arranged at an angle of 45° to the rotation axis, emitting a beam into a region to be monitored, while the other mirror, arranged perpendicular to the previous one, casts a beam, reflected from the region to be monitored, via a concave mirror onto a receiver arranged at the focal point thereof. If this device is accommodated in a housing provided with a window, the same problems arise as have already been discussed above.

Published German Patent Application 19 530 281 has disclosed a device for optically detecting obstacles from vehicles, which comprises a scanner arranged in a housing, the housing being provided with a cambered front plate for sealing against weather effects in a fashion corresponding to a headlamp front plate.

SUMMARY OF THE INVENTION

It is the object of the invention to provide a device for locating objects penetrating into a region of space to be monitored in which device radiation reflected at the window is prevented from impinging on the receiver, and likewise the occurrence of an astigmatic effect with respect to the emitted beam is avoided.

The inventive use of a window in the form of a spherical section whose centre is the point of intersection of the rotation axis with the optical axes of the incident and emerging beams produces boundary surfaces of the window which are equidistant from said point of intersection, with the result that light, reflected thereat, of the emerging beam is reflected back into itself, the optical effect of said boundary surfaces with respect to an emitted beam being exactly the same in each cutting plane through the centre of the sphere, as a result of which no astigmatic effect can occur. Radiation, scattered or deflected at possibly polluted sites of the transmitting deflecting mirror or at body edges present there, of the transmitted beam is projected into itself at a scale of 1:1 through the window in the form of a spherical section, and therefore cannot reach the receiver.

Further advantages and embodiments of the invention are to be gathered from the following description and the subclaims.

BRIEF DESCRIPTION OF THE DRAWINGS

The invention will be explained in more detail below with reference to the preferred embodiment represented in the attached drawings.

FIG. 3 shows a diagram of the beam path in the case of a window used in accordance with the device of FIG. 1.

DETAILED SPECIFICATION

Figure 1:
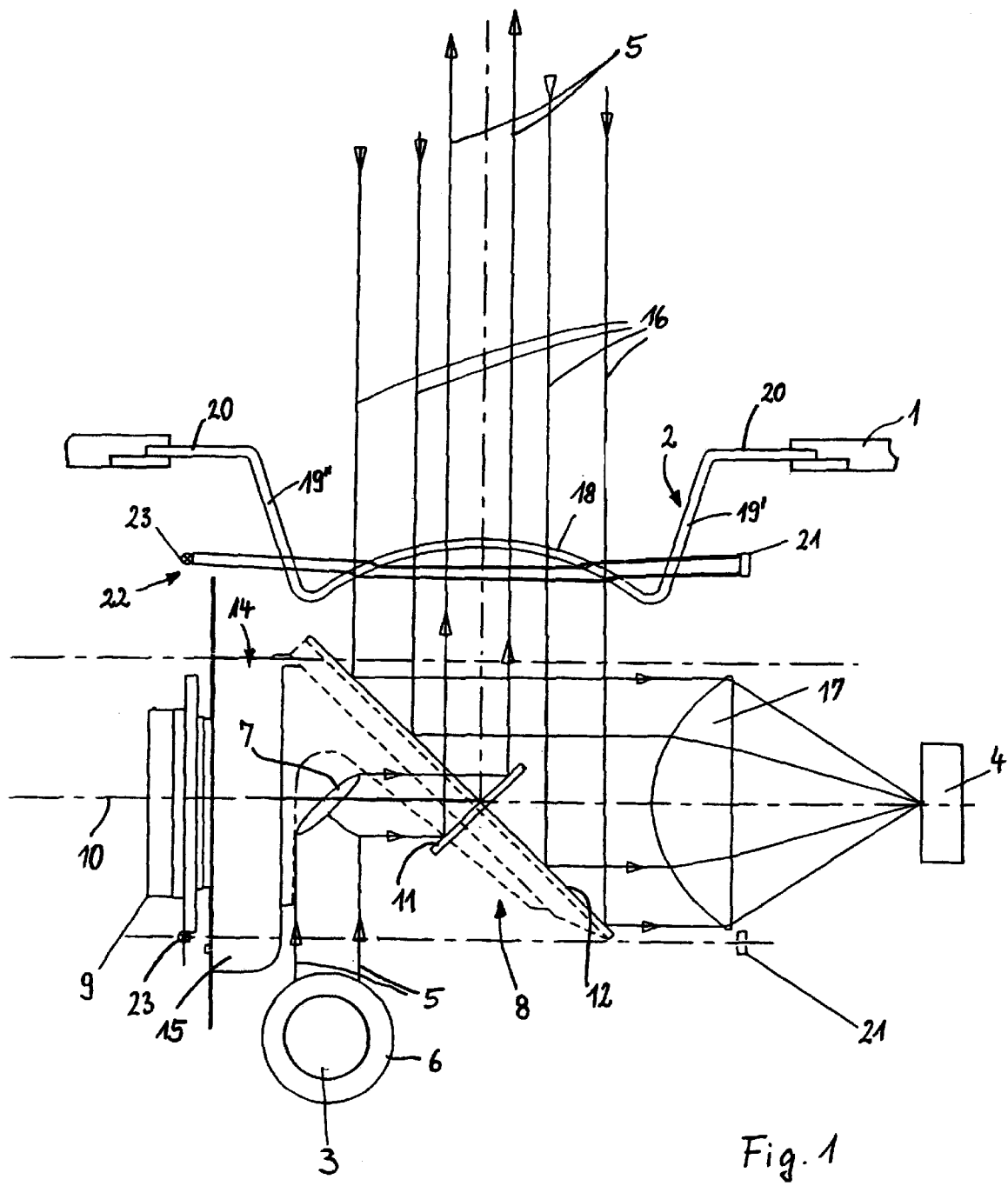
FIG. 1 shows a diagram of an embodiment of a device for locating objects penetrating into a region of space to be monitored.

The device represented in FIG. 1 comprises a housing 1, which is provided with a window 2 towards a region of space to be monitored. Located inside the housing 1 are a transmitter 3 and a receiver 4 for optical radiation, in particular (pulsed) laser radiation. A beam 5 emitted by the transmitter 3 is cast onto an optical deflecting device 8 via a collimating optical system 6 and two plane adjusting and deflecting mirrors 7 inclined by 45°. The deflecting device 8 can be rotated about a rotation axis 10 via a motor 9.

The deflecting device 8 comprises a transmitting deflecting mirror 11 and a receiving deflecting mirror 12 which is fixed in relation thereto and mounted in a perpendicular fashion. The plane transmitting and receiving deflecting mirrors 11, 12 are both arranged inclined to the rotation axis 10 at an angle of 45°, the receiving deflecting mirror 12 having a central recess 13 in which the transmitting deflecting mirror 11 is arranged.

The transmitting and receiving deflecting mirrors 11, 12 are fastened to a carrier 14 whose foot 15 is coupled to a motor 9 in order to rotate the deflecting device 8 about the rotation axis 10.

The beam 5 is reflected from the transmitting deflecting mirror 11 through the window 2 into the region of space to be monitored and, as a consequence of the continuous rotation of the deflecting device 8, sweeps over the region of space to be monitored.

A beam 16 reflected from an object in the region of space to be monitored enters the housing 1 through the window 2 and falls onto a receiving deflecting mirror 12 from which it falls onto a receiving collimator 17 which focuses the beam 16 onto the receiver 4, which establishes the presence or absence of an object in the region of space to be monitored.

The window 2 is elongated, of uniform height and thickness and leads, for example, to a scanning region which extends over approximately 180° perpendicular to the rotation axis 10. The scanning region of the emitted beam 5 is limited by a central section 18 of the window 2 in the form of a spherical section whose centre is the point of intersection of the rotation axis 10 with the optical axes of the incident and emerging beams 5, 16.

The result of this is, as represented in FIG. 3, that the beam 5 reflected from the transmitting deflecting mirror 11 is partially reflected at the two spherical and equidistant boundary surfaces of the central section 18, in the form of a spherical section, of the window 2, and focused at the focal point F of said spherical surfaces, with the result that this radiation reflected at the window 2 is reflected back into itself and thus causes no interference.

Moreover, there is a further advantage in the equidistant boundary surfaces of the central section 18, in the form of a spherical section, of the window 2 in that their optical effect is exactly the same with respect to the transmitted beam 5 in every cutting plane through the centre of the sphere, with the result that no astigmatic effect occurs.

Radiation scattered or detracted at possibly polluted sites of the transmitting deflecting mirror 11 or at the edges thereof is likewise projected into itself on a scale of 1:1 through the equidistant boundary surfaces of the central section 18, in the form of a spherical section, of the window 2, with the result that these components of transmitted radiation are also incapable of reaching the receiver 4 by reflection at the window 2.

A circumferential edge region 19', 19", which extends in the direction of the convexity of the window 2, that is to say outwards and merges into a circumferential flange 20 advantageously adjoins the central section 18 of the window 2. As a result, it is possible to undertake effective measurement of the pollution on the window 2, as is described below.

Provided in the housing 1, along an edge region 19', extending over approximately 180°, of the window 2 in a semicircle around the rotation axis 10, is an annular arrangement of receivers 21 which receives from a pollution-measuring transmitter arrangement 22 arranged in the housing 1 along the opposite edge region 19", likewise in a semicircle around the rotation axis 10, optical radiation, in particular IR radiation, which has passed the central section 18 twice as well as the opposite edge regions 19', 19", of the window 2.

Pollution-measuring transmitters 23 of the pollution-measuring transmitter arrangement 22 can in this case likewise be arranged in an annular fashion along the corresponding edge region 19" of the window 2, said transmitters and the associated receivers 21 being operated in a multiplex fashion.

Figure 2:
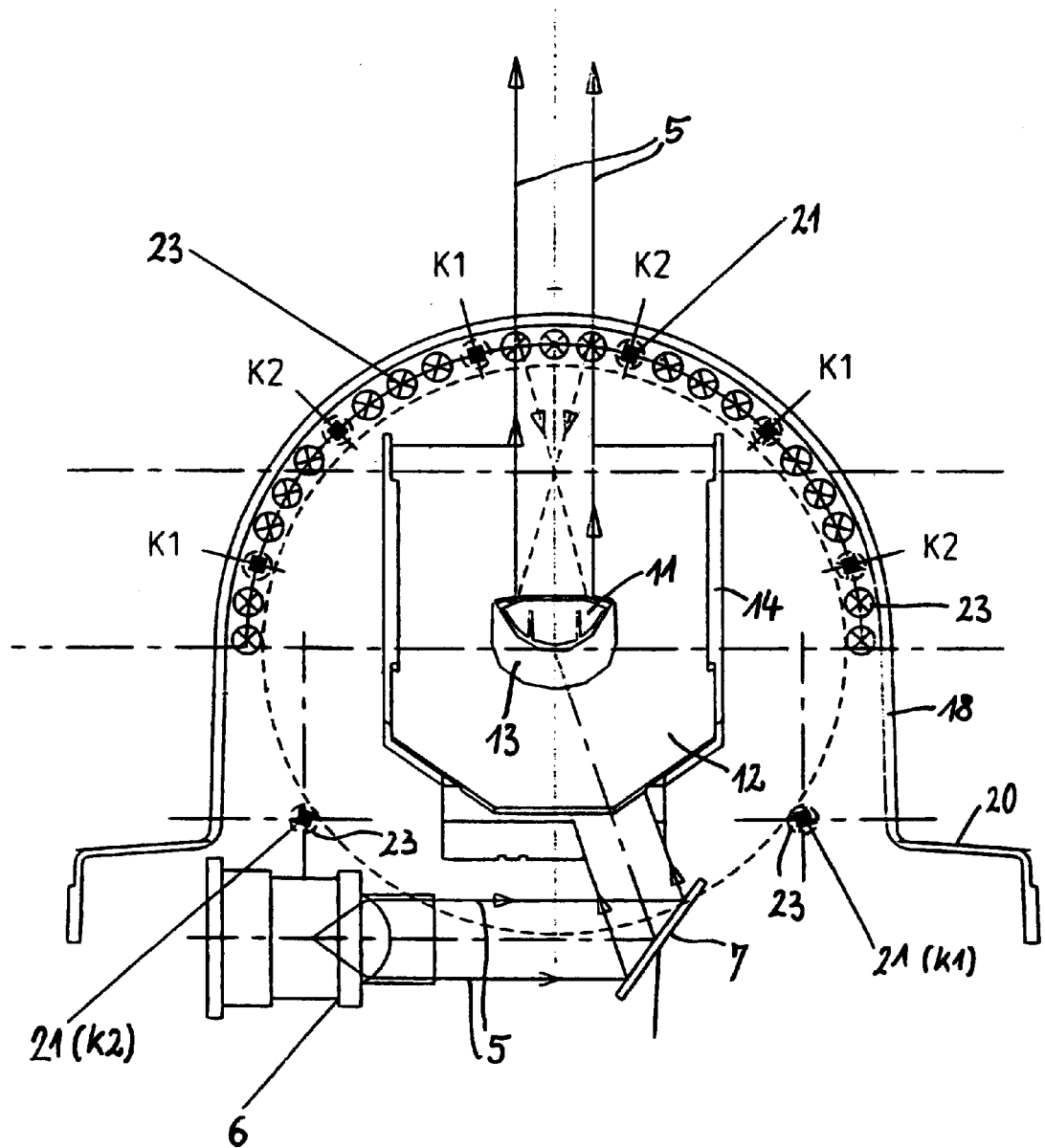
FIG. 2 shows the device of FIG. 1 in a view from the right with reference to FIG. 1.

However, it is advantageous in this case to use the light lobe emitted from a pollution-measuring transmitter 23 by assigning several pollution-measuring transmitters 23 (for example subminiature infrared diodes) to a single receiver 21 (for example SI-PIN diodes), that is to say use is made, for example, of 25 pollution-measuring transmitters 23 and 6 receivers 21 which are arranged in each case equidistantly from one another. Diodes used as pollution-measuring transmitters 23 have, for example, an emission angle of approximately 20° (half width). The receivers 21 are connected in parallel with the receiver 21 respectively arranged next but one, resulting in each case in the presence of two active receiving systems K1, K2 (compare FIG. 2). The pollution-measuring transmitters 23 are operated in the time-division multiplex fashion, with the result that "radiation channels" form at a discrete instant between the pollution-measuring transmitters 23 and receivers 21, which channels penetrate the window 2 twice, pollution in one or both penetrated zones leading to signal attenuation at the corresponding receiver 21.

The emission angle of the pollution-measuring transmitters 23 and the spacing between 2 parallel-connected receivers 21 are expediently selected such that irrespective of how the pollution-measuring transmitters are driven, it is possible for two receivers 21 of a receiving system to be subjected to radiation.

In this way, it is possible to undertake pollution measurement, above all even of the edge zones of the central region 18 of the window 2, since pollution can be detected in the core zone of the window 2, possibly by the receiver 4 itself.

Appropriate reference transmitters/receivers 21(K1) and 21(K2), 23, respectively, can be provided in order to monitor the fact that the two receiving systems K1, K2 are switched on or operationally ready.

Instead of using pollution-measuring transmitters 23, it is also possible to use a pollution-measuring beam masked out of the transmitted beam 5, or a pollution-measuring beam emitted appropriately from an individual pollution-measuring transmitter, which pollution-measuring beam is detected by corresponding receivers 21 after passing the central section 18 at least once by rotating around the rotation axis 10 via a corresponding deflecting mirror, which rotates with the deflecting device 8, for example, and passing at least one edge region 19', 19". In this case, a uniformly backscattering surface can be arranged in the housing 1 between the deflecting mirror and the receivers 21, onto which surface the pollution-measuring beam reflected from the deflecting mirror impinges at a variable angle.

While the invention has been shown and described with reference to a preferred embodiment, it should be apparent to one of ordinary skill in the art that many changes and modifications may be made without departing from the spirit and scope of the invention as defined in the claims.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

In the claims:

1. Device for locating objects penetrating into a region of space to be monitored, comprising a housing provided with a window, said housing containing a transmitter and a receiver for optical radiation as well as a rotatable optical deflecting device with a transmitting deflecting mirror as well as a receiving deflecting mirror, said transmitting deflecting mirror being rotatable and having a mirror surface and a rotation axis inclined with respect to said mirror surface, a beam of optical radiation emerging through said window in the housing being directed by the transmitting deflecting mirror into the region of space to be monitored, and radiation reflected from the region of space and incident through said window being directed by the receiving deflecting mirror onto said receiver, wherein said window has the shape of a section of a sphere, said sphere having as centre the point of intersection of said rotation axis with the optical axes of the incident and emerging beams, said receiving deflecting mirror being arranged perpendicular to said transmitting deflecting mirror, and said transmitting and receiving deflecting mirrors being arranged at an angle of 45° to the rotation axis.

2. Device according to claim 1, wherein said window has an edge region extending in the direction of the convexity of said window and running around said rotation axis, there being provided along the edge region a multiplicity of pollution-measuring receivers which receive optical radiation from a pollution-measuring transmitter arrangement arranged in said housing.

3. Device according to claim 2, wherein in mirror-image with the edge region along which said pollution-measuring receivers are arranged a further edge region is provided which is passed by the optical radiation of the pollution-measuring transmitter arrangement.

4. Device according to claim 3, wherein a multiplicity of pollution-measuring transmitters are arranged adjacent to the further edge region.

5. Device according to claim 2, wherein several pollution-measuring transmitters cooperate in multiplex operation with one pollution-measuring receiver in each case.

6. Device according to claim 2, wherein said pollution-measuring transmitter arrangement comprises a pollution-measuring transmitter and a rotating deflecting mirror.

7. Device according to claim 2, wherein said pollution-measuring transmitter arrangement comprises a pollution-measuring beam masked out of the beam and a rotating deflecting mirror.

8. Device according to claim 6, wherein said rotating deflecting mirror is rotatable with said deflecting device.

9. Device according to claim 6, wherein there is arranged in said housing between the rotating deflecting mirror and said pollution-measuring receivers a uniformly backscattering surface onto which the pollution-measuring beam reflected from the deflecting mirror impinges at a variable angle.

10. Device according to claim 7, wherein there is arranged in said housing between the rotating deflecting mirror and said pollution-measuring receivers a uniformly backscattering surface onto which the pollution-measuring beam reflected form the deflecting mirror impinges at a variable angle.

* * * * *